United States Patent
George et al.

(10) Patent No.: US 10,635,328 B2
(45) Date of Patent: *Apr. 28, 2020

(54) DIGITALLY TRANSFERRING CONTENT ACROSS MEDIA WITHOUT REPRODUCTION

(71) Applicants: Johann George, Sunnyvale, CA (US); Mark Vrieling, Haiku, HI (US); John Mitchell, Accokeek, MD (US)

(72) Inventors: Johann George, Sunnyvale, CA (US); Mark Vrieling, Haiku, HI (US); John Mitchell, Accokeek, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,825

(22) Filed: Apr. 15, 2016

(65) Prior Publication Data
US 2016/0306585 A1    Oct. 20, 2016

Related U.S. Application Data

(60) Provisional application No. 62/149,238, filed on Apr. 17, 2015.

(51) Int. Cl.
| | | |
|---|---|---|
| H04L 29/00 | (2006.01) | |
| G06F 3/06 | (2006.01) | |
| G06F 12/14 | (2006.01) | |
| G06F 21/10 | (2013.01) | |
| H04L 9/08 | (2006.01) | |
| G06F 21/60 | (2013.01) | |
| G06F 12/00 | (2006.01) | |

(52) U.S. Cl.
CPC ............ G06F 3/0619 (2013.01); G06F 3/061 (2013.01); G06F 3/065 (2013.01); G06F 3/0623 (2013.01);
(Continued)

(58) Field of Classification Search
CPC ...... G06F 21/10; G06F 21/602; G06F 3/0647; G06F 3/0623; G06F 3/0619; G06F 3/061;
(Continued)

(56) References Cited

U.S. PATENT DOCUMENTS

2007/0113723 A1    5/2007  Mizuno
2008/0095189 A1    4/2008  Frazier et al.
(Continued)

FOREIGN PATENT DOCUMENTS

EP    1742206 A1    1/2007

OTHER PUBLICATIONS

George, International Search Report and Written Opinion, PCT/US2016/028135, dated Aug. 5, 2016, 10 pgs.
(Continued)

*Primary Examiner* — Joseph P Hirl
*Assistant Examiner* — Chi D Nguy
(74) *Attorney, Agent, or Firm* — Morgan, Lewis & Bockius LLP

(57) ABSTRACT

Content is transferred from a first non-volatile storage medium to a second non-volatile storage medium without reproduction. This is accomplished by reading first data stored in the first non-volatile storage medium from the first non-volatile storage medium to volatile memory, erasing the first data from the first non-volatile storage medium, and after erasing the first data from the first non-volatile storage medium, storing corresponding data in a second non-volatile storage medium. And after storing the corresponding data in the second non-volatile storage medium, the first data is erased from the volatile memory. The first data is not concurrently stored in the first non-volatile storage medium and the second non-volatile storage medium.

19 Claims, 7 Drawing Sheets

(52) U.S. Cl.
CPC .......... *G06F 3/0647* (2013.01); *G06F 3/0655* (2013.01); *G06F 3/0656* (2013.01); *G06F 3/0683* (2013.01); *G06F 3/0685* (2013.01); *G06F 3/0688* (2013.01); *G06F 12/00* (2013.01); *G06F 12/1408* (2013.01); *G06F 21/10* (2013.01); *G06F 21/602* (2013.01); *H04L 9/0825* (2013.01); *H04L 9/0894* (2013.01); *G06F 2212/1052* (2013.01); *G06F 2212/402* (2013.01)

(58) Field of Classification Search
CPC .. G06F 3/0685; G06F 12/00; G06F 2221/402; G06F 12/1408; H04L 9/0825
See application file for complete search history.

(56) References Cited

U.S. PATENT DOCUMENTS

| | | | | |
|---|---|---|---|---|
| 2009/0172258 | A1* | 7/2009 | Olbrich | G06F 13/1657 |
| | | | | 711/103 |
| 2009/0254751 | A1* | 10/2009 | Fujiwara | H04L 9/12 |
| | | | | 713/171 |
| 2011/0060887 | A1* | 3/2011 | Thatcher | G06F 3/0604 |
| | | | | 711/171 |
| 2011/0296100 | A1* | 12/2011 | Plank | G06F 11/1662 |
| | | | | 711/113 |
| 2012/0166737 | A1 | 6/2012 | Furuichi et al. | |
| 2015/0067282 | A1* | 3/2015 | Kobayashi | G06F 3/0619 |
| | | | | 711/158 |

OTHER PUBLICATIONS

George, International Preliminary Report on Patentability, PCT/US2016/028135, dated Oct. 17, 2017, 8 pgs.
George, Office Action, U.S. Appl. No. 15/130,832, filed Nov. 3, 2017, 15 pgs.
George, Examiners Report, CA2981617, dated Jan. 30, 2019, 3 pgs.
George, Final Office Action, U.S. Appl. No. 15/130,832, dated Jul. 12, 2018, 13 pgs.
George, Notice of Allowance, U.S. Appl. No. 15/130,832, dated Feb. 11, 2019, 8 pgs.

* cited by examiner

The first data stored in the first non-volatile storage medium corresponds to a segment of a data set stored in the first non-volatile storage medium, the data set includes a plurality of segments, and the method includes repeating the method for each of the plurality of segments of the data set ~520

DIGITALLY TRANSFERRING CONTENT ACROSS MEDIA WITHOUT REPRODUCTION

RELATED APPLICATIONS

This application claims priority to U.S. Provisional Patent Application No. 62/149,238, filed Apr. 17, 2015, which application is incorporated by reference herein in its entirety.

This application is related to U.S. patent application Ser. No. 15/130,832, "Digitally Lending Content Without Reproduction," filed Apr. 15, 2016, which application is incorporated by reference herein in its entirety.

TECHNICAL FIELD

The disclosed embodiments relate generally to content transfer systems and clients and the transferring of media content across separate media without reproduction.

BACKGROUND

Transferring content from one medium to another may involve making a copy of the content. It is thus difficult for the owner of a lawfully made digital copy to transfer copyrighted works from one medium to another because copyright law generally prohibits reproduction of a copyrighted work into another copy. Therefore, it would be desirable to have a system and method of transferring content from one medium to another without reproduction of the copyrighted content. It would also be desirable to have a system and method of efficiently lending and returning content between distinct media without reproduction.

SUMMARY (A1) In accordance with some embodiments, a method of transferring data includes: reading first data stored in a first non-volatile storage medium from the first non-volatile storage medium to volatile memory; erasing the first data from the first non-volatile storage medium; after erasing the first data from the first non-volatile storage medium, storing corresponding data in a second non-volatile storage medium; and after storing the corresponding data in the second non-volatile storage medium, erasing the first data from the volatile memory. The first data stored in the first non-volatile storage medium and the corresponding data stored in the second non-volatile storage medium are not concurrently stored.

In accordance with some embodiments, a computer system includes one or more processors, memory, one or more programs stored in the memory, the one or more programs including instructions for reading first data stored in a first non-volatile storage medium from the first non-volatile storage medium to volatile memory, erasing the first data from the first non-volatile storage medium, and after erasing the first data from the first non-volatile storage medium, storing corresponding data in a second non-volatile storage medium. The one or more programs further includes instructions for erasing the first data from the volatile memory after storing the corresponding data in the second non-volatile storage medium. The first data stored in the first non-volatile storage medium and the corresponding data stored in the second non-volatile storage medium are not concurrently stored.

In some embodiments, the one or more programs of the aforementioned computer system including instructions for performing any of the methods described herein.

In accordance with some embodiments, a non-transitory computer readable storage medium stores one or more programs configured for execution by a computer system, the one or more programs including instructions that when executed by one or more processors of the computer system cause the computer system to: read first data stored in a first non-volatile storage medium from the first non-volatile storage medium to volatile memory; erase the first data from the first non-volatile storage medium; after erasing the first data from the first non-volatile storage medium, store corresponding data in a second non-volatile storage medium; and erase the first data from the volatile memory, after storing the corresponding data in the second non-volatile storage medium. The first data stored in the first non-volatile storage medium and the corresponding data stored in the second non-volatile storage medium are not concurrently stored.

(B1) In accordance with some embodiments, a method of transferring data includes: reading first data stored in a first non-volatile storage medium from the first non-volatile storage medium to a first volatile memory; transmitting corresponding data from the first volatile memory to a second volatile memory, wherein the corresponding data is configured to be stored in a second non-volatile storage medium. The method also includes, after the corresponding data is read from the first non-volatile storage medium to the first volatile memory, or after the corresponding data is transmitted to the second volatile memory, erasing at least a portion of the first data from the first non-volatile storage medium; and after the corresponding data is transmitted to the second volatile memory, or after the corresponding data is stored in the second non-volatile storage medium, erasing the first data from the first volatile memory. The corresponding data is erased from the second volatile memory after the corresponding data is stored in the second non-volatile storage medium, and the portion of the first data stored in the first non-volatile storage medium and the corresponding data stored in the second non-volatile storage medium are not concurrently stored.

(C1) In accordance with some embodiments, the method of B1 further includes: receiving, in the first volatile memory, data (e.g., one or more keys for decrypting one or more data segments) from the second volatile memory including at least a portion of the corresponding data, wherein the received data was read from the second non-volatile storage medium to the second volatile memory; after the corresponding data is erased from the second non-volatile storage medium, storing the received data in the first non-volatile storage medium; and after storing the received data in the first non-volatile storage medium, erasing the received data from the first volatile memory. The received data is erased from the second volatile memory after the received data is received in the first volatile memory or after the received data is stored in the first non-volatile storage medium, and the corresponding data stored in the second non-volatile storage medium and the received data stored in the first non-volatile storage medium are not concurrently stored.

In accordance with some embodiments, a computer system includes one or more processors, memory, one or more programs stored in the memory, the one or more programs including instructions for reading first data stored in a first non-volatile storage medium from the first non-volatile storage medium to a first volatile memory; transmitting corresponding data from the first volatile memory to a second volatile memory, wherein the corresponding data is configured to be stored in a second non-volatile storage medium; after the corresponding data is read from the first non-volatile storage medium to the first volatile memory, or after the corresponding data is transmitted to the second volatile memory, erasing at least a portion of the first data from the first non-volatile storage medium; and after the corresponding data is transmitted to the second volatile memory, or after the corresponding data is stored in the second non-volatile storage medium, erasing the first data from the first volatile memory. The corresponding data is erased from the second volatile memory after the corresponding data is stored in the second non-volatile storage medium, and the portion of the first data stored in the first non-volatile storage medium and the corresponding data stored in the second non-volatile storage medium are not concurrently stored.

In accordance with some embodiments, a non-transitory computer readable storage medium stores one or more programs configured for execution by a computer system, the one or more programs including instructions that when executed by one or more processors of the computer system cause the computer system to: read first data stored in a first non-volatile storage medium from the first non-volatile storage medium to a first volatile memory; transmit corresponding data from the first volatile memory to a second volatile memory, wherein the corresponding data is configured to be stored in a second non-volatile storage medium; after the corresponding data is read from the first non-volatile storage medium to the first volatile memory, or after the corresponding data is transmitted to the second volatile memory, erase at least a portion of the first data from the first non-volatile storage medium; and after the corresponding data is transmitted to the second volatile memory, or after the corresponding data is stored in the second non-volatile storage medium, erase the first data from the first volatile memory. The corresponding data is erased from the second volatile memory after the corresponding data is stored in the second non-volatile storage medium, and the portion of the first data stored in the first non-volatile storage medium and the corresponding data stored in the second non-volatile storage medium are not concurrently stored.

BRIEF DESCRIPTION OF THE DRAWINGS

Like reference numerals refer to corresponding parts throughout the drawings.

DESCRIPTION OF EMBODIMENTS

Figure 1:
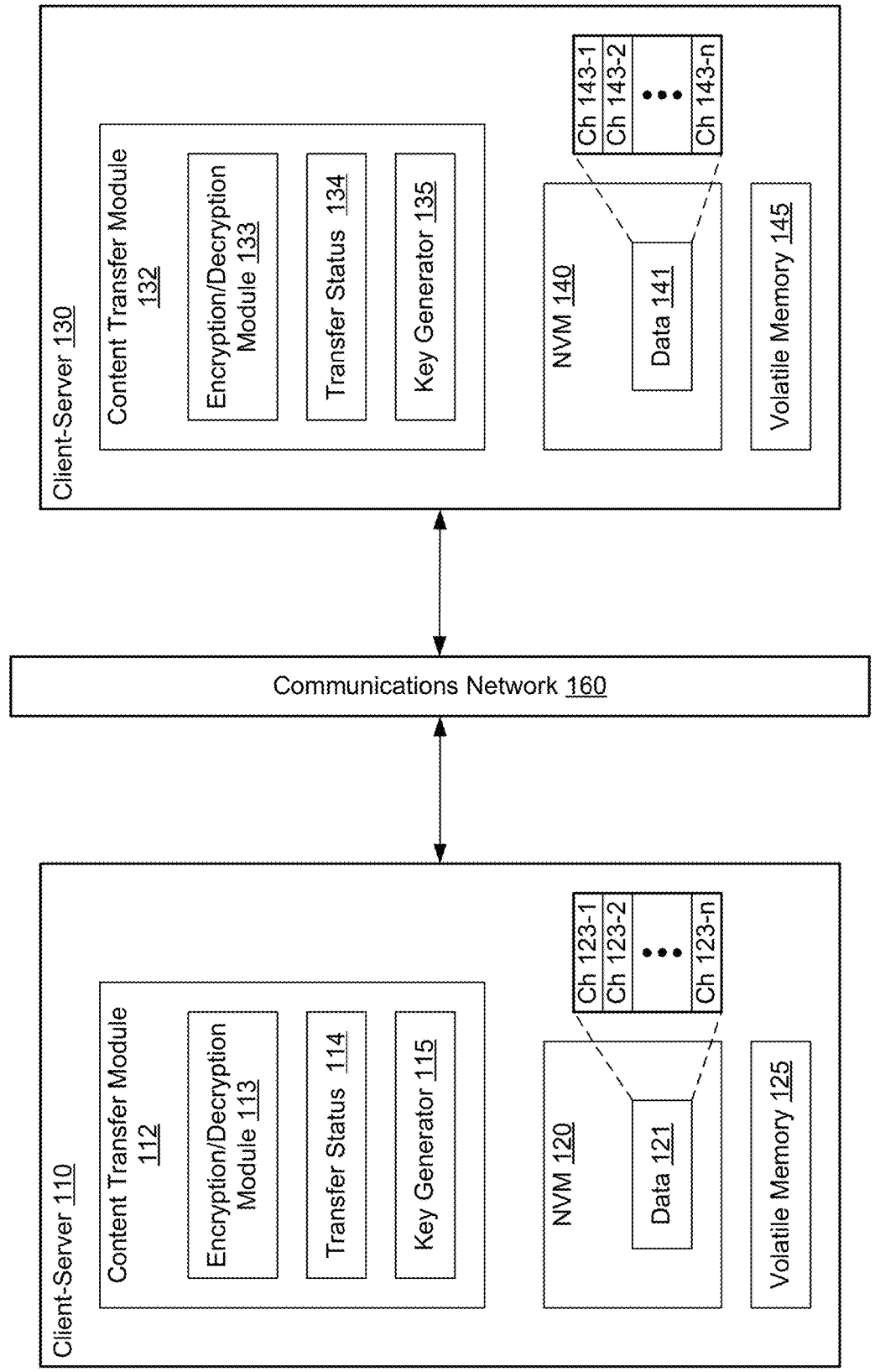
FIG. 1 is a block diagram illustrating an implementation of a content transfer system, in accordance with some embodiments.

The various implementations described herein include systems, methods, and/or devices used to enable content transfer across separate media without reproduction.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such as "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the invention and the described embodiments. However, the invention may be practiced without these specific details. In other instances, well-known methods, procedures, components, and circuits have not been described in detail so as not to unnecessarily obscure aspects of the embodiments.

FIG. 1 is a block diagram illustrating an implementation of a content transfer system 100, in accordance with some embodiments. The content transfer system 100 includes a communications network 160 and a plurality of client-servers, including a first client-server 110 and a second client-server 130.

In some embodiments, client-server 110 includes content transfer module 112, non-volatile memory (NVM, also referred to as non-volatile storage or a non-volatile storage medium) 120, and volatile memory 125. In some embodiments, each of the non-volatile memories, such as NVM 120 and NVM 140, as well as NVM 220 (FIG. 2), in system 100 is a flash memory device, CD (compact disc), DVD ("digital versatile disc" or "digital video disc"), Blu-Ray Disc™ (a trademark of Blu-Ray Disc Association), audio tape or video tape, or other media in which data is durably stored. Furthermore, in some embodiments, each of the volatile memories, such as volatile memory 125 and volatile memory 145, in system 100 comprises DRAM, SRAM, or other memory medium in which data is not durably stored, and more generally in which data is stored for a period of not more than transitory duration.

In some embodiments, content transfer module 112 includes encryption/decryption module 113, transfer status module 114, and key generator 115. In some embodiments, non-volatile memory NVM 120 stores data 121, which in some embodiments includes any number (i.e., one or more) of data chunks (e.g., Ch 123-1, Ch 123-2, through Ch 123-n). Similarly, client-server 130 includes content transfer module 132, non-volatile memory NVM 140, and volatile memory 145. In some embodiments, content transfer module 132 includes encryption/decryption module 133, transfer status module 134, and key generator 135, and non-volatile memory NVM 140 stores data 141, which in some embodiments includes any number of data chunks (e.g., Ch 143-1, Ch 143-2, through Ch 143-n). More detailed discussion about the implementation of client-server 110 and/or client-server 130 is provided below with respect to FIGS. 2 and 4A-4B.

Communication network 160 may be any suitable communication network or connection, such as the Internet, also referred to as the World Wide Web (WWW), a wired local area network, a direct wired connection (sometimes called a communications bus or cable or the like) between client-server 110 and client-server 130, an intranet and/or a wireless network, such as a cellular telephone network, a wireless local area network (LAN) and/or a metropolitan area network (MAN), a wireless connection (e.g., a Bluetooth™ connection), or any other communication network or connection suitable for transferring a content file or data set between devices, or any combination of such communication networks and/or connections. Thus, client-server 110 and client-server 130 may be positioned near each other, for example within 1 millimeter, 1 meter, or 10 meters, or 100 meters of each other, or may be remotely located relative to each other, when a content file or data set is transferred from a first non-volatile memory, in or coupled to client-server 110 to a second non-volatile memory, in or coupled to client-server 130.

Figure 2:
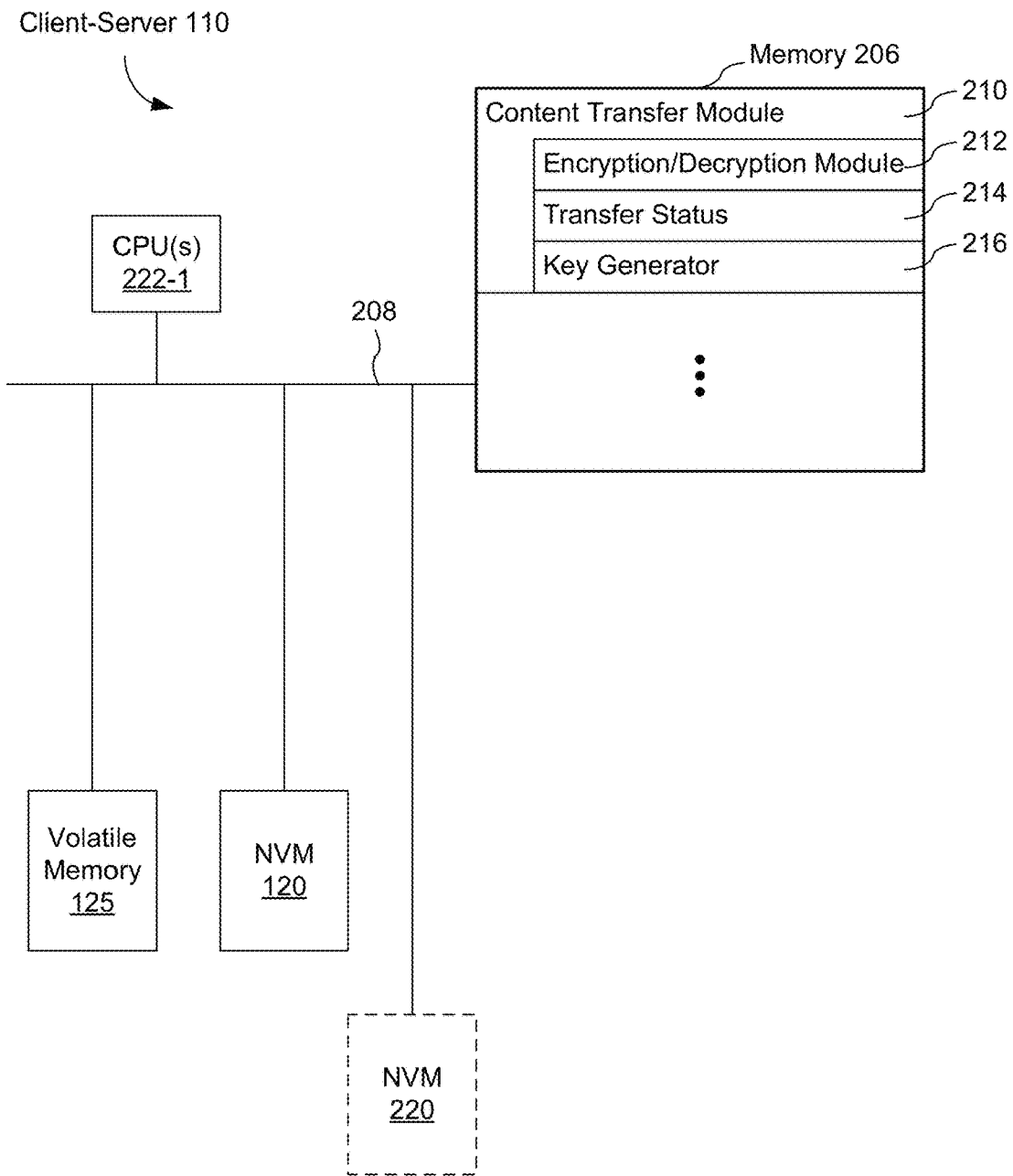
FIG. 2 is a block diagram illustrating a client-server of a content transfer system, in accordance with some embodiments.

FIG. 2 is a block diagram illustrating client-server 110 (and similarly, client-server 130) of a content transfer system 100, in accordance with some embodiments. Client-server 110 typically includes one or more processing units 222-1 (sometimes herein called CPUs, processors, or hardware processors, and sometimes implemented using microprocessors, microcontrollers, or the like) for executing modules, programs and/or instructions stored in memory 206 and thereby performing processing operations; memory 206; non-volatile memory NVM 120; volatile memory 125; and one or more communication buses 208 for interconnecting these components. In some embodiments, non-volatile memory NVM 120 is a removable non-volatile memory device, such as a flash drive. In some embodiments, client-server 120 further includes a second non-volatile memory NVM 220 (e.g., a removable non-volatile memory device, such as flash memory drive), in which case the second NVM 220 is coupled to other components of client-server by communication buses 208. Communication buses 208 optionally include circuitry (sometimes called a chipset) that interconnects and controls communications between system components. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 222-1. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset or superset thereof:

- a content transfer module 210 that is used for managing content transfer between separate media and/or between separate client-servers 110 and 130, and that may include one or more of the following:
  - encryption/decryption module 212 that is used for encrypting and/or decrypting content in conjunction with its transfer, and that may use keys generated by key generator 216 as described herein;
  - transfer status module 214 that is used for monitoring the status of content transfer, and that may monitor the status of one or more chunks of content being transferred;
  - key generator 216 that is used for generating encryption/decryption keys for one or more portions of content.

Each of the above identified elements may be stored in one or more of the previously mentioned memory devices that together form memory 206, and corresponds to a set of instructions, executable by the one or more processors of client-server 110, for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 5A-5B.

Although FIG. 2 shows client-server 110, FIG. 2 is intended more as a functional description of the various features which may be present in a client-server than as a structural schematic of the embodiments described herein. In practice, and as recognized by those of ordinary skill in the art, items shown separately could be combined and some items could be separated.

Client-server 110 may be any suitable computer device, such as a computer server, a laptop computer, a tablet device, a netbook, an internet kiosk, a personal digital assistant, a mobile phone, a smart phone, a gaming device, custom-built hardware, or any other computing device. Similarly, client-server 130 may be any suitable computer device, and may, but need not be, the same type of computer device as client-server 110.

Figure 3:
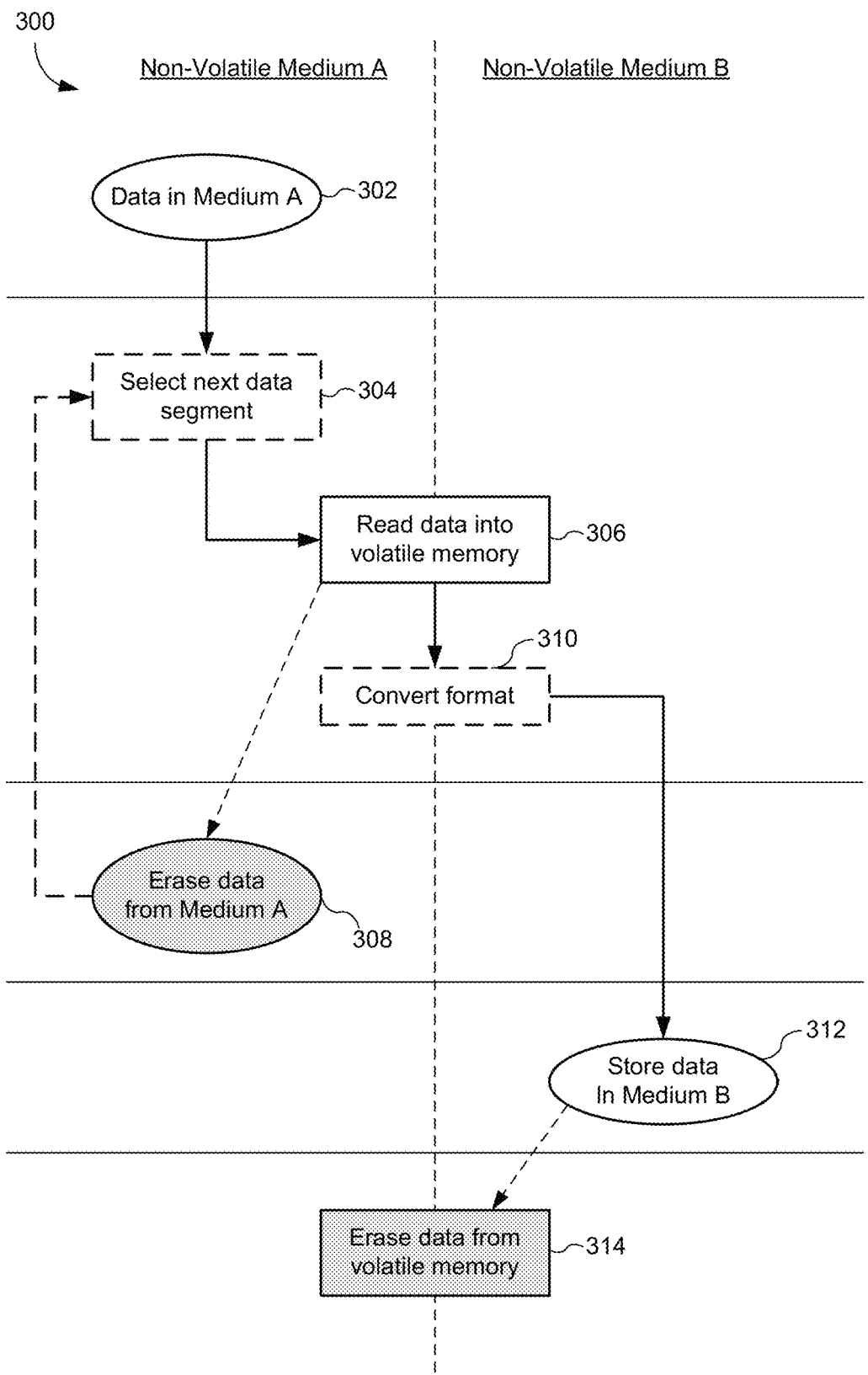
FIG. 3 illustrates a conceptual flowchart representation of a method of content transfer across separate media without reproduction, in accordance with some embodiments.

FIG. 3 illustrates a conceptual flowchart representation of a method of content (also referred to herein as "content data") transfer across separate media without reproduction 300, in accordance with some embodiments. In some embodiments, method 300 is performed by a content transfer system, such as by content transfer system 100 or a component thereof such as client-server 110 (FIG. 1). In some embodiments, method 300 is performed within client-server 110 across internal communication buses (e.g., communication buses 208, FIG. 2) to transfer content between a first non-volatile storage medium (e.g., NVM 120, FIG. 2) and a second non-volatile storage medium (e.g., NVM 220, FIG. 2), which in some such embodiments are both included in client-server 110. In some embodiments, method 300 is performed by client-server 110 and client-server 130 communicating via a network (e.g., communications network 160) to transfer content between non-volatile memory in client-server 110 (e.g., NVM 120, FIG. 1) and non-volatile memory in client-server 130 (e.g., NVM 140, FIG. 1).

The method begins, in some embodiments, with content (e.g., data 121, FIG. 1) being stored (302) in a first non-volatile storage medium NVM A (e.g., NVM 120, FIG. 1). In some embodiments, the content is stored in NVM A as a content file (also referred to herein as a "data set"). In some embodiments, the entire content file is transferred all at once. In some embodiments, the content file or data set includes a plurality of data segments (e.g., data chunks 123-1, 123-2 through 123-n, FIG. 1), and the content file is transferred one or more segments at a time.

In some embodiments in which a content file is transferred in segments, the content transfer system selects (304) a next data segment of the content data (e.g., a respective chunk 123-i of data 121, FIG. 1) to be transferred. In some embodiments, the content transfer system selects a next subset of a plurality of data segments to be transferred.

Next, the content transfer system reads (306) the selected data (or data segment) into volatile memory (e.g., volatile memory 125, FIG. 1).

After the selected data is read into volatile memory, the content transfer system erases (308) the selected data from NVM A. In some embodiments, how the selected data is erased depends on the memory medium in which NVM A is implemented. In various embodiments, erasing the selected data (308) includes permanent erasure of either the selected data in its entirety, or permanent erasure of a sufficient portion of the selected data, such that the selected data cannot be perceived, reproduced, or otherwise communicated, either directly or with the aid of a machine or device. For example, if the selected data is a portion of a content file (e.g., an audio file or program, video file or program, multimedia document, or textual document), the result of erasing operation 308 is that the portion of the content file in the selected data can no longer be played, viewed, perceived, reproduced or otherwise communicated from NVM A, either directly or with the aid of a machine. In some embodiments, the content transfer system erases (308) the selected data from NVM A by means of physical destruction of the storage medium (e.g., NVM A), or physical destruction of at least the portion of the storage medium in which the selected data, or a portion of the selected data, was stored. For example, in embodiments in which NVM A is a CD or DVD, erasing operation 308 may include physical destruction (e.g., using a laser) of one or more sectors of the CD or DVD in which the selected data is stored.

Erasing the selected data from NVM A prior to the selected data being written to another non-volatile memory or persistent storage thereby erases the "copy" of the selected data in NVM A. The term "copy" is used with its present meaning as assigned in the U.S. Copyright Act, 17, U.S.C. § 101, and accordingly refers to a material object in which a work is fixed and from which the work can be perceived, reproduced, or otherwise communicated, either directly or with the aid of a machine or device.

It is noted that the definition of "copy" in the U.S. Copyright Act includes the term "fixed." The term "fixed" is also defined in the U.S. Copyright Act, as follows. "A work is 'fixed' in a tangible medium of expression when its embodiment in a copy or phonorecord, by or under the authority of the author, is sufficiently permanent or stable to permit it to be perceived, reproduced, or otherwise communicated for a period of more than transitory duration. A work consisting of sounds, images, or both, that are being transmitted, is 'fixed' for purposes of this title if a fixation of the work is being made simultaneously with its transmission." It is further noted that, in accordance with this definition, data temporarily stored in a volatile memory is not "fixed" so long as it is stored in the volatile memory "for a period of not more than transitory duration." As noted above, in some embodiments, each of the volatile memories, such as volatile memory 125 and volatile memory 145, in system 100 comprises DRAM, SRAM, or other memory medium in which data is not durably stored, and more generally in which data is stored for a period of not more than transitory duration.

In some embodiments, during performance of any of the methods (e.g., method 300, FIG. 3; method 400a, FIG. 4A; method 400b, FIG. 4B; and method 500, FIGS. 5A-5B) described herein, the selected data, as well as any other data segments or other data copied to volatile memory (e.g., volatile memory 125 or volatile memory 145, FIG. 1) is stored in that volatile memory for a period of not more than transitory duration.

Optionally, in some embodiments, the content transfer system converts (310) a format of the selected data. In some embodiments, the format conversion is performed on the selected data that has been read into volatile memory. In some embodiments, format conversion includes encryption or decryption of content using keys. In some embodiments, format conversion includes conversion of content into a format required for playback on an output device, such as a stereo system, television, or monitor. In some embodiments, format conversion is performed independently of the erase operation. In other words, format conversion of data that has been read into volatile memory from a first non-volatile memory need not be done in any particular order with respect to erasing the corresponding data from the first non-volatile memory.

In some embodiments, the selected data is transferred across a network (e.g., from a first client-server such as client-server 110 to a second client-server such as client-server 130 across communications network 160, FIG. 1). In some such embodiments, reading selected data into volatile memory includes reading the selected data from a first non-volatile memory NVM A (e.g., NVM 120, FIG. 1) into a first volatile memory A (e.g., volatile memory 125, FIG. 1) at the first client-server, and then transmitting the selected data from the first volatile memory A to a second volatile memory B (e.g., volatile memory 145, FIG. 1) at the second client-server. In such embodiments, format conversion may be performed at the first volatile memory or at the second volatile memory. In some embodiments, format conversion may be performed in part at the first volatile memory and in part at the second volatile memory. More detail regarding content data transfer across a network is provided herein with reference to FIGS. 4A and 4B.

Next, the content transfer system stores (312) the selected data in a second non-volatile storage medium NVM B (e.g., a second NVM 220 of client-server 110, FIG. 2, or NVM 140 of client-server 130, FIG. 1). Because the selected data is stored in the second NVM B after the copy of the selected data was erased from the first NVM A (308), at no point does more than one copy (i.e., persistent fixation in a tangible medium) of the selected data exist between NVM A and NVM B.

After the selected data is stored in NVM B, the content transfer system erases (314) the selected data from volatile memory.

Optionally, in some embodiments in which content (e.g., a content file) is transferred in segments, the content transfer system repeats operation 304 and subsequent operations of method 300 for a next data segment or set of segments. As FIG. 3 shows an example embodiment in which operation 304 is repeated for a next data segment after operation 308 is performed on a prior data segment, those of ordinary skill in the art will recognize that a respective segment or set of segments may but need not be fully processed and transferred before processing is begun for a subsequent segment or set of segments. Thus, processing may be performed in a pipelined manner, and a plurality of segments may be in various stages of the transfer process at any given time.

In some embodiments, when the content transfer system completes respective operations of method 300, such as (but without limitation) reading data into volatile memory (306), erasing (308) the selected data from NVM A, storing (312) data in NVM B, and erasing data from volatile memory, a status table or log (e.g., stored in or by the content transfer system) is updated to reflect the completion of each respective operation and, optionally, the time at which the respective operation was performed. In some embodiments, such updating is performed by transfer status module 114, transfer status module 134 (FIG. 1), or transfer status module 214 (FIG. 2).

Figure 4A:
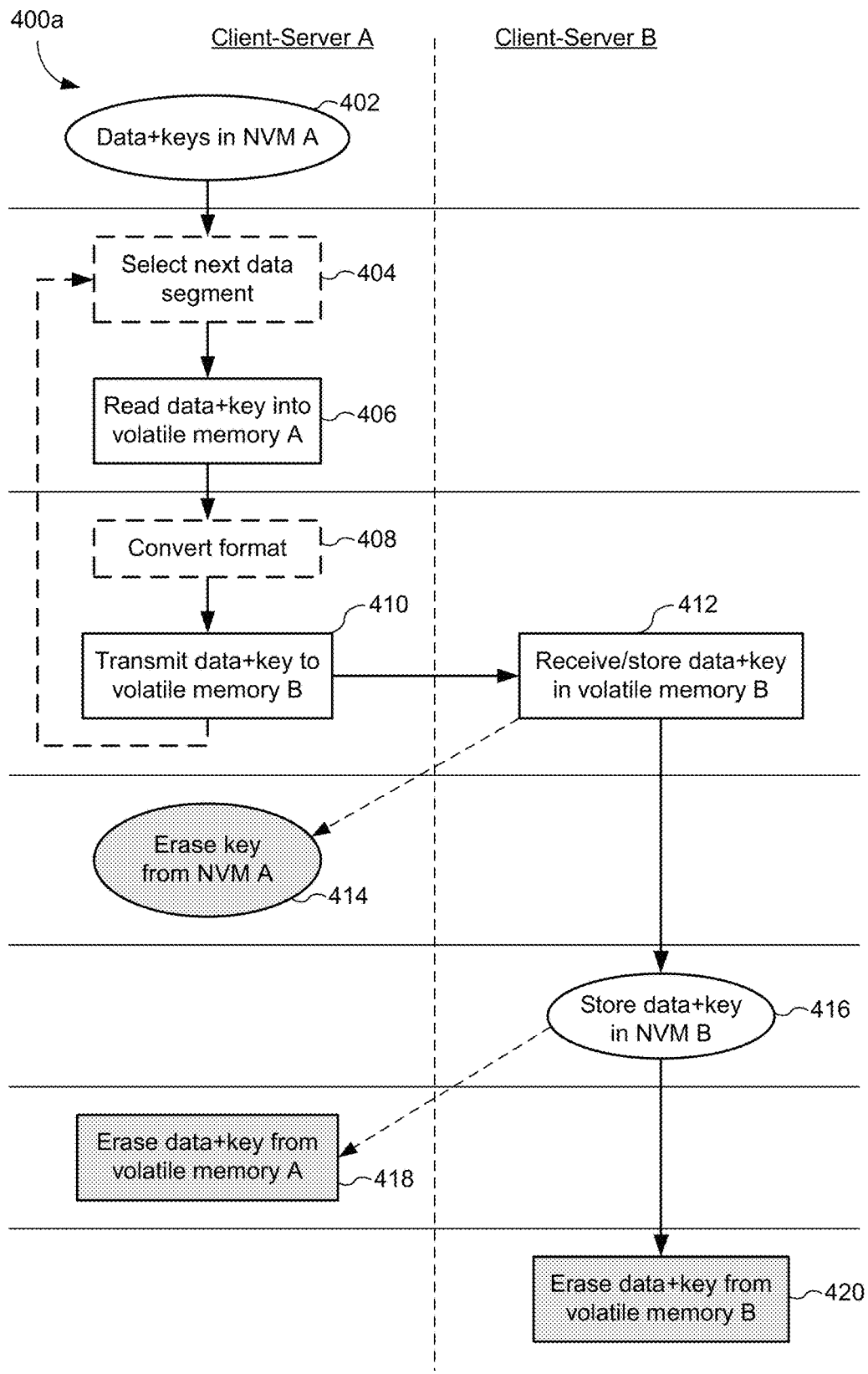
FIG. 4A illustrates a conceptual flowchart representation of a method of content transfer across a network without reproduction, in accordance with some embodiments.
Figure 4B:
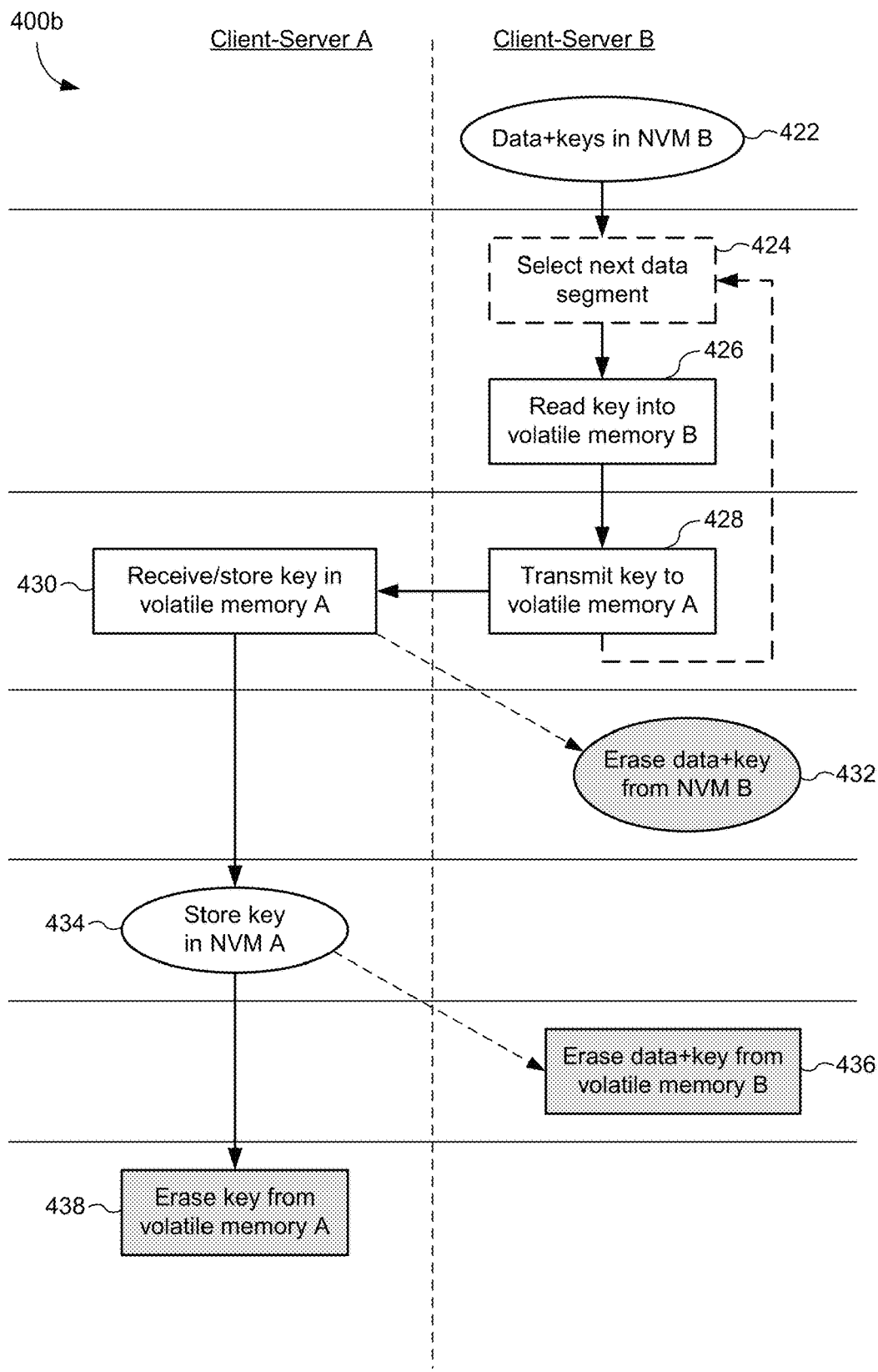
FIG. 4B illustrates a conceptual flowchart representation of a method of content return across a network without reproduction, in accordance with some embodiments.

FIGS. 4A and 4B illustrate conceptual flowchart representations of methods of content transfer and return across a network without reproduction, in accordance with some embodiments. In particular, FIG. 4A illustrates a conceptual flowchart representation of a method of content transfer in accordance with some embodiments, and FIG. 4B illustrates a conceptual flowchart representation of a method of content return, in accordance with some embodiments.

With respect to FIG. 4A, in some embodiments, method 400a is performed by a content transfer system, such as by content transfer system 100. In some embodiments, method 400a is performed by a plurality of client-servers (e.g., client-server 110 and client-server 130, FIG. 1) communicating via a network (e.g., communications network 160) to transfer content between non-volatile memory in a first client-server (e.g., NVM 120 of client-server 110, FIG. 1) and non-volatile memory in a second client-server (e.g., NVM 140 of client-server 130, FIG. 1).

The method begins, in some embodiments, with content (e.g., data 121, FIG. 1) being stored (402) in a first non-volatile storage medium NVM A in a first client-server A (e.g., NVM 120 of client-server 110, FIG. 1). As shown in FIG. 4A, in some embodiments, the content is stored as encrypted data. In some embodiments, a respective portion of encrypted data has a respective corresponding key that is used to encrypt and/or decrypt the data. In some embodiments, transferring data includes transferring both the data and its corresponding key(s). As shown in FIG. 4A, in some embodiments, the content stored in NVM A includes encrypted data and one or more corresponding keys.

In some embodiments, as described above with reference to FIG. 3, the content is stored as a content file, optionally including a plurality of data segments (e.g., chunks 123-1, 123-2 through 123-n), and in some embodiments the content is transferred all at once or one or more segments at a time. Thus, in some embodiments in which a content file is optionally transferred in segments, the content transfer system selects (404) a next data segment, or a next subset of a plurality of data segments, of the content data to be transferred. In addition, in some embodiments, each respective segment of a content file has a respective corresponding key.

Next, the content transfer system reads (406) the selected data (or data segment) and its corresponding key from NVM A into a first volatile memory A (e.g., volatile memory 125, FIG. 1).

After the selected data and key is read into volatile memory A, in some embodiments, the content transfer system optionally converts (408) a format of the selected data, as described above with reference to FIG. 3. In some embodiments, if the selected data that has been read into volatile memory A is encrypted, format conversion includes decrypting the selected data using its corresponding key. One or more forms of format conversion may be performed on the selected data either at volatile memory A or after the selected data is transferred to a second volatile memory B, as described herein with reference to operation 410. In some embodiments, format conversion may be performed in part at volatile memory A and in part at volatile memory B.

In some embodiments, operation 404, 406 or 408 includes generating a key for the selected data, for example using key generator 115 (FIG. 1), or accessing a key for the selected data previously generated using a key generator such as key generator 115, and encrypting the selected data using that key.

Next, the content transfer system transmits (410) the selected data and its corresponding key from volatile memory A in client-server A (e.g., volatile memory 125 of client-server 110, FIG. 1) to a second volatile memory B in a second client-server B (e.g., volatile memory 145 of client-server 130, FIG. 1). In some embodiments, the selected data and its corresponding key are transmitted via a network (e.g., communications network 160, FIG. 1). In conjunction with the transmission, the selected data and its corresponding key are received and stored (412) in volatile memory B. In some embodiments, such as those in which one or more forms of format conversion were performed on the selected data, the data transmitted from the first volatile memory A to the second volatile memory B is corresponding data, in that it corresponds to the selected data but is in a different format, for example.

Next, the content transfer system erases (414) at least the corresponding key for the selected data from NVM A. More generally, after the corresponding data is read from the first non-volatile storage medium to the first volatile memory, or after the corresponding data is transmitted to the second volatile memory B, the content transfer system erases at least a portion of the selected data (e.g., the corresponding key for the selected data) from the first non-volatile storage medium. Thus, even if the selected data continues to be stored in an encrypted format in NVM A after its corresponding key is erased, the encrypted selected data cannot be decrypted without its corresponding key, and as such cannot be perceived or reproduced or otherwise communicated or played back on an output device. Erasing the corresponding key for the selected data from NVM A prior to the corresponding key being stored in another non-volatile memory or persistent storage thereby erases the "copy" in NVM A of the content (or portion thereof) corresponding to the selected data.

After at least the corresponding key for the selected data is erased from NVM A (414), the content transfer system stores (416) the corresponding data (corresponding to the selected data and its corresponding key) in a second non-volatile storage medium NVM B in client-server B (e.g., NVM 140 of client-server 130, FIG. 1). Because the corresponding data, corresponding to the selected data and its corresponding key, are stored in the second NVM B after erasing at least the corresponding key from the first NVM A, at no point does more than one copy (i.e., persistent fixation in a tangible medium) of the content corresponding to the selected data exist between NVM A and NVM B. More generally, the portion of the content data (e.g., the corresponding key for the selected data) in the first non-volatile storage medium is not concurrently stored with the selected data and its corresponding key in the second non-volatile storage medium.

Next, after the corresponding data, corresponding to selected data and its corresponding key, are stored in the second NVM B, the content transfer system erases the selected data and its corresponding key from the first volatile memory A (418) and the second volatile memory B (420). Alternatively, the content transfer system erases the selected data and its corresponding key from the first volatile memory A (418) after the corresponding data, corresponding to the selected data and its corresponding key, have been transmitted to the second volatile memory B (410), and erases the corresponding data from the second volatile memory B (420) after the corresponding data are stored in the second NVM B. Thus, the selected data and its corresponding key are erased from the first volatile memory A after the corresponding data is transmitted to the second volatile memory, or after the corresponding data is stored in the second non-volatile storage medium. Erasing the selected data and its corresponding key from volatile memory A and volatile memory B need not be done in any particular order with respect to each other and may be done concurrently.

Optionally, in some embodiments in which content is transferred in segments, the content transfer system repeats operation 404 and subsequent operations of method 400a for a next data segment or set of segments. More generally, in some embodiments operations 404 to 420 are repeated for successive segments of a data set or content file until the entire data set or content file has been transferred from NVM A to NVM B. Furthermore, as FIG. 4A shows an example embodiment in which operation 404 is repeated for a next data segment after operation 410 is performed on a prior data segment, those of ordinary skill in the art will recognize that a respective segment or set of segments may but need not be fully processed and transferred before processing is begun for a subsequent segment or set of segments, as discussed above with reference to FIG. 3.

In some embodiments, after method 400a is performed a first time, thereby transferring a content file or data set from a first non-volatile memory to a second non-volatile memory, method 400a is repeated or performed a second time so as to transfer the same content file or data set from the second non-volatile memory to a third non-volatile memory distinct from the first and second non-volatile memory. For example, after the content file has been transferred to the second non-volatile memory, a user of the second non-volatile memory may play, view or otherwise utilize the content file in the second non-volatile memory. Sometime after that, the user of the second non-volatile memory initiates performance of method 400a so as to transfer the content file from the second non-volatile memory to the third non-volatile memory. After the content file has been transferred to the third non-volatile memory, a user of the third non-volatile memory may play, view or otherwise utilize the content file in the third non-volatile memory.

FIG. 4B illustrates a conceptual flowchart representation of a method 400b of content return, in which content is returned from a second non-volatile memory to a first non-volatile memory, in accordance with some embodiments. In some embodiments, method 400b is performed by a content transfer system (e.g., content transfer system 100, FIG. 1). In some embodiments, method 400b is performed by a plurality of client-servers (e.g., client-server 110 and client-server 130, FIG. 1) communicating via a network (e.g., communications network 160) to return content from non-volatile memory in a second client-server (e.g., NVM 140 of client-server 130, FIG. 1) to non-volatile memory in a first client-server (e.g., NVM 120 of client-server 110, FIG. 1).

The method begins, in some embodiments, with content being stored (422) in (i.e., already stored or "resident" in) a second non-volatile storage medium NVM B in a second client-server B (e.g., NVM 140 of client-server 130, FIG. 1). As shown in FIG. 4B, and as described above with reference to FIG. 4A, in some embodiments, the content is stored as encrypted data and one or more corresponding keys, wherein a respective portion of encrypted data has a respective corresponding key.

In some embodiments, as described above with reference to FIGS. 3 and 4A, the content is stored as a content file including a plurality of data segments. In some such embodiments, the content transfer system selects (424) a next data segment of the content data to be transferred, wherein the selected next data segment has a respective corresponding key. In some embodiments, a next set of data segments is selected to be transferred, where each respective data segment is encrypted and has a respective corresponding key for decrypting the respective data segment.

Next, the content transfer system reads (426) the corresponding key for the selected data from NVM B to a second volatile memory B in client-server B (e.g., volatile memory 145 of client-server 130, FIG. 1).

Next, the content transfer system transmits (428) the corresponding key for the selected data from volatile memory B in client-server B (e.g., volatile memory 145 of client-server 130, FIG. 1) to a first volatile memory A in a first client-server A (e.g., volatile memory 125 of client-server 110, FIG. 1). In some embodiments, the corresponding key is transmitted via a network (e.g., communications network 160, FIG. 1). In conjunction with the transmission, the corresponding key is received and stored (430) in volatile memory A. More generally, the first volatile memory A receives data from the second volatile memory B including at least a portion of the content data corresponding to the selected data. In some embodiments, the "portion" is or includes the corresponding key for the selected data.

Next, in some embodiments, after the corresponding key is received and stored in volatile memory A (e.g., returned to volatile memory A) (430), the content transfer system erases (432) the at least the key corresponding to the selected data from NVM B. Optionally, the selected data is also erased (432) after the corresponding key is received and stored in volatile memory A. However, in embodiments in which the selected data is retained in NVM B in client-server B in an encrypted format that requires the corresponding key for decryption, erasing the corresponding key for the selected data from NVM B prior to the corresponding key being stored in another non-volatile memory or persistent storage device erases the "copy" in NVM B, on client-server B, of the content corresponding to the selected data.

In some circumstances, or some embodiments, retaining the selected data in NVM B in an encrypted format that requires the corresponding key for decryption, without retaining the corresponding key in NVM B, can be useful because it facilitates transfer of a "copy" of the selected data back to client-server B. In particular, if the selected data in encrypted format is retained in NVM B, a "copy" of the selected data can be transferred back to NVM B by transferring the corresponding key from a current holder (e.g., NVM A in client-server A) of that key to NVM B.

In some embodiments in which the selected data is stored in NVM B in a format that is unencrypted and/or playable on an output device, the "copy" of the content corresponding to the selected data is erased (432) by erasing both the selected data and its corresponding key.

After the selected data and its corresponding key are erased from NVM B (432), the content transfer system stores (434) the corresponding key in a first non-volatile memory NVM A in the first client-server A (e.g., NVM 120 of client-server 110, FIG. 1) from the first volatile memory A. In some embodiments, storing the corresponding key in NVM A returns the corresponding key to client-server A, which in some embodiments restores the "copy" of the content corresponding to the selected data back to client-server A after the "copy" is erased from client-server B. As noted above, returning the corresponding key to client-server A without also returning the selected data allows the content to be returned quickly and reduces the amount of data that needs to be transferred between client-server B and client-server A. Moreover, because the corresponding key is stored in the first NVM A after erasing the corresponding key (and optionally the selected data) from the second NVM B, at no point does more than one copy of the content corresponding to the selected data exist between NVM A and NVM B. More generally, the corresponding data (e.g., the content corresponding to the selected data) is not stored in the second non-volatile storage medium concurrently with the portion (e.g., the corresponding key) being stored in the first non-volatile storage medium.

Next, the content transfer system erases the corresponding key from the second volatile memory B (436) and erases the corresponding key from the first volatile memory A (438). Alternatively, the content transfer system erases the corresponding key from the second volatile memory B (436) after the corresponding key has been transmitted to the first volatile memory A (428), or the corresponding key has been received and stored in the first volatile memory (430), and erases the corresponding key from the first volatile memory A (438) after the corresponding key is stored in the first NVM A (434). Optionally, erase operation 436 includes erasing the selected data, if present in the second volatile memory B, from the second volatile memory B. These operations, 436 and 438, may be done in either order or concurrently.

In some embodiments, the first non-volatile storage medium and the first volatile memory (e.g., NVM 120 and volatile memory 125, respectively, FIG. 1) are located at a host device (e.g., client-server 110, FIG. 1), and the second non-volatile storage medium and the second volatile memory (e.g., NVM 140 and volatile memory 145, FIG. 1) are located at a client device distinct from the host device (e.g., client-server 130, distinct from client-server 110, FIG. 1).

It is noted that, while FIG. 4B shows the respective key for the selected data segment being transmitted, in some embodiments, the selected data segment may also be transmitted in addition to its respective key. However, those skilled in the art will recognize that, in some embodiments in which the selected data, without its respective key, is already stored in an encrypted format in NVM A, as described above with reference to FIG. 4A, the content transfer system need only transmit the respective key, and that transmitting the respective key would be sufficient to restore the "copy" of the content corresponding to the selected data to NVM A after the NVM B "copy" no longer exists.

Optionally, in some embodiments in which content is transferred in segments, the content transfer system repeats operation 424 and subsequent operations of method 400b for a next data segment or set of segments. More generally, in some embodiments operations 424 to 438 are repeated for successive segments of a data set or content file until the entire data set or content file has been transferred from NVM A to NVM B, or all the keys corresponding to the entire data set or content file have been transferred from NVM A to NVM B. As FIG. 4B shows an example embodiment in which operation 424 is repeated for a next data segment after operation 428 is performed on a prior data segment, and as discussed above with reference to FIGS. 3 and 4A, those of ordinary skill in the art will recognize that a respective segment or set of segments may but need not be fully processed and transferred before processing is begun for a subsequent segment or set of segments.

In some embodiments, when the content transfer system completes respective operations of method 400a and/or method 400b, such as any of the operations described above, a status table or log (e.g., stored in or by the content transfer system) is updated to reflect the completion of each respective operation and, optionally, the time at which the respective operation was performed. In some embodiments, such updating is performed by transfer status module 114, transfer status module 134 (FIG. 1), or transfer status module 214 (FIG. 2).

Figure 5A:
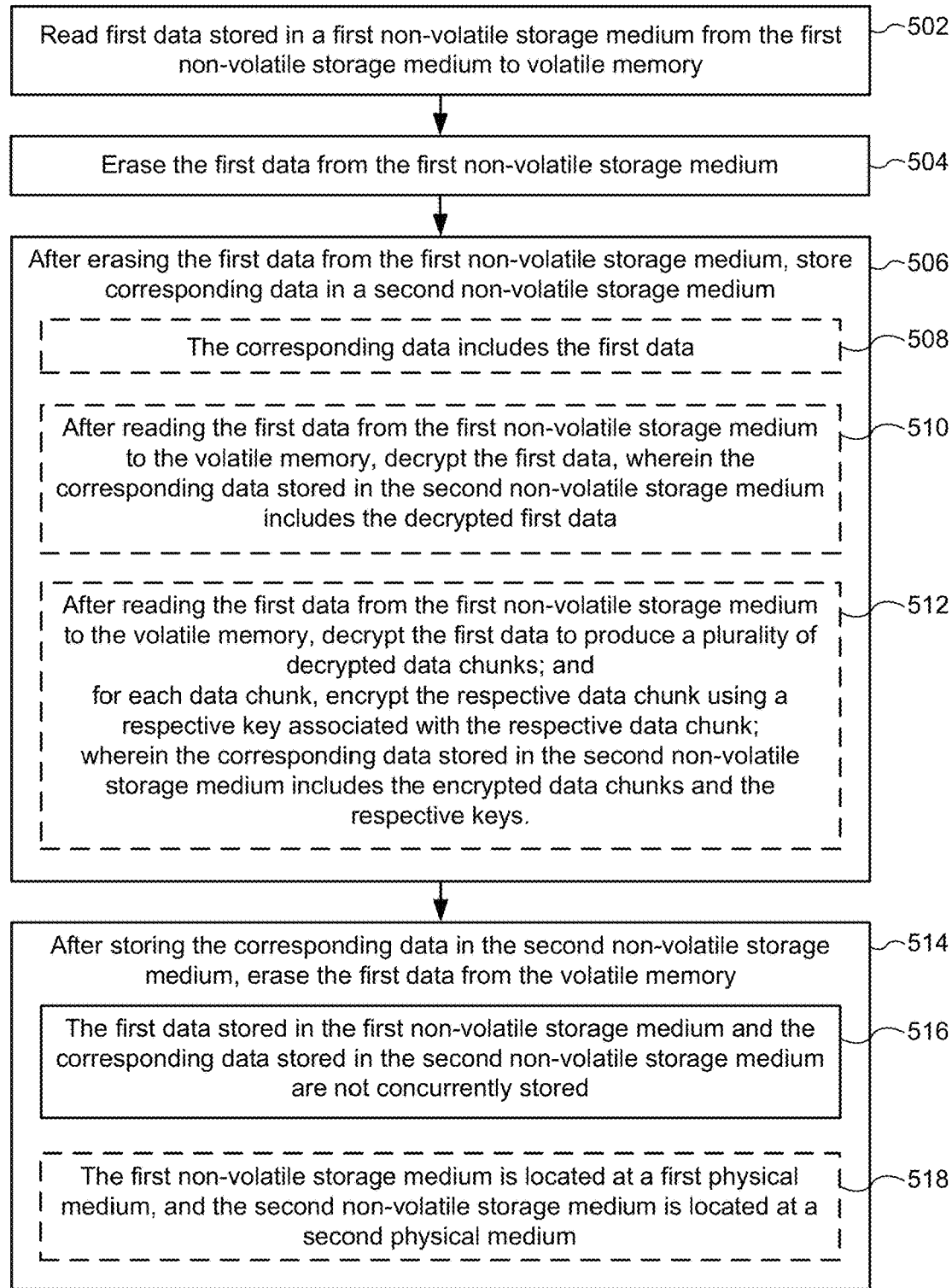
FIGS. 5A-5B illustrate a flowchart representation of a method of content transfer without reproduction, in accordance with some embodiments.
Figure 5B:

FIGS. 5A-5B illustrate a flowchart representation of a method 500 of content transfer without reproduction, in accordance with some embodiments. With reference to FIG. 1, in some embodiments, method 500 is performed by a content transfer system, such as content transfer system 100, or a component thereof such as client-server 110 (FIG. 1). In some embodiments, some of the operations (or alternatively, steps) of method 500 are performed at a first client-server (e.g., client-server 110, FIG. 1) that is operatively coupled with a second client-server (e.g., client-server 130, FIG. 1), such as via a communications network (e.g., communications network 160, FIG. 1). In some embodiments, the method 500 is governed by instructions that are stored in a non-transitory computer readable storage medium and that are executed by one or more processors of a device, such as the one or more processing units (CPUs) 222-1 of client-server 110 (FIG. 2) and/or one or more processing units of client-server 130 (not shown).

With reference to FIG. 2, in some embodiments, the operations of method 500 are performed, at least in part, by a client-server (e.g., client-server 110, FIG. 2) including a content transfer module (e.g., content transfer module 210, including an encryption/decryption module 212, transfer status 214, and key generator 216, FIG. 2) and using volatile memory (e.g., volatile memory 125, FIG. 2) and one or more non-volatile memories (e.g., NVM 120 and/or NVM 220, FIG. 2). For ease of explanation, the following describes method 500 as performed by a content transfer system.

With reference to FIG. 5A, in some embodiments, the content transfer system (e.g., content transfer system 100, FIG. 1) reads (502) first data (e.g., data 121, or a respective chunk 123-i thereof, FIG. 1) stored in a first non-volatile storage medium (e.g., NVM 120 of client-server 110, FIG. 1) from the first non-volatile storage medium to volatile memory (e.g., volatile memory 125 and/or volatile memory 145, FIG. 1). In some embodiments, the non-volatile storage medium is a flash memory device, CD (compact disc), DVD ("digital versatile disc" or "digital video disc"), Blu-Ray Disc™ (a trademark of Blu-Ray Disc Association), audio tape or video tape. In some embodiments, the non-volatile storage medium may be an analog medium, such as a book or photograph, wherein reading the first data may include an analog-to-digital data conversion.

Next, in some embodiments, the content transfer system erases (504) the first data from the first non-volatile storage medium.

Next, in some embodiments, after erasing the first data from the first non-volatile storage medium, the content transfer system stores (506) corresponding data (e.g., data 141, or a respective chunk 143-i thereof, FIG. 1) in a second non-volatile storage medium (e.g., NVM 220 of client-server 110, FIG. 2, or NVM 140 of client-server 130, FIG. 1). In some embodiments, the corresponding data includes (508) the first data.

In some embodiments, after reading the first data from the first non-volatile storage medium to the volatile memory, the content transfer system decrypts (510) the first data. In some such embodiments, the corresponding data stored in the second non-volatile storage medium includes the decrypted first data.

In some embodiments, after reading the first data from the first non-volatile storage medium to the volatile memory, the content transfer system decrypts (512) the first data to produce a plurality of decrypted data chunks and, for each data chunk, encrypts the respective data chunk using a respective key associated with the respective data chunk. In some such embodiments, the corresponding data stored in the second non-volatile storage medium includes the encrypted data chunks and the respective keys.

In some embodiments, a key is generated for each data chunk using key generator 115 or 135 (FIG. 1), key generator 216 (FIG. 2), or any suitable key generating mechanism, such as a pseudo-random number generator. In some embodiments, if the first data is not initially encrypted when read from the first non-volatile storage medium, a distinct key is generated for each data segment of the first data, using a suitable key generator. This can be done in conjunction with operation 404 or 406 of method 400a, or operation 502 or 506 of method 500. Furthermore, in some embodiments, if the first data is initially encrypted, and is decrypted by operation 512 using a previously obtained key, a new key can be generated for the first data or any segment of the first data, using any of the aforementioned key generators, and that new key is used to encrypt the first data, or a segment of the first data, during operation 512.

Next, in some embodiments, after storing the corresponding data (e.g., data 141, or a respective chunk 143-i thereof, FIG. 1) in the second non-volatile storage medium, the content transfer system erases (514) the first data (e.g., data 121, or a respective chunk 123-i thereof, FIG. 1) from the volatile memory. The first data, or any segment of the first data, stored in the first non-volatile storage medium and the corresponding data stored in the second non-volatile storage medium are not concurrently stored (516) at any point in time during the data transfer process. In some embodiments, the first non-volatile storage medium is located at a first physical medium, and the second non-volatile storage medium is located at a second physical medium (518), such as those described above with respect to operation 502. Similarly, in some embodiments, the first non-volatile storage medium is located at a first client-server (e.g., client-server 110, FIG. 1), and the second non-volatile storage medium is located at a second client-server (e.g., client-server 130, FIG. 1).

With reference to FIG. 5B, in some embodiments, the first data stored in the first non-volatile storage medium corresponds (520) to a segment (e.g., a respective chunk 123-i of data 121, FIG. 1) of a data set (e.g., content file) stored in the first non-volatile storage medium, the data set includes a plurality of segments (e.g., chunks 123-1, 123-2 through 123-n of data 121, FIG. 1), and the method includes repeating the method for each of the plurality of segments of the data set. In some embodiments, and as discussed above with reference to FIGS. 3 and 4A-4B, an entire data set may be transferred all at once, or a data set may be transferred one or more segments at a time.

In some embodiments, a rate at which method 500 is repeated is limited in accordance with a predefined limit on an amount of data concurrently in transit between two non-volatile storage media or two computer systems. For example, the amount of data in transit at any one time may be limited to a predefined percentage (e.g., 10% or 20%) of a data set, or alternatively, the amount of data in transit at any one time may be limited to a predefined quantity of data, such as 10 megabytes, 100 megabytes, or other appropriate quantity.

As those skilled in the art will recognize, in some embodiments, the methods described herein to transfer content from a first non-volatile storage medium to a second non-volatile storage medium may be repeated to transfer the content from the second non-volatile storage medium to a third non-volatile storage medium. In some embodiments, after content is transferred from a first client-server to a second client-server, the method may be repeated to transfer the content from the second client-server to a third client-server, and so on, and, in some embodiments, the content may eventually be returned to the first client-server.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of transferring data, comprising:
   reading first data stored in a first non-volatile storage medium from the first non-volatile storage medium to volatile memory;

after reading first data from the first non-volatile storage medium to the volatile memory, erasing at least a portion of the first data from the first non-volatile storage medium;

after erasing at least a portion of the first data from the first non-volatile storage medium, storing corresponding data in a second non-volatile storage medium distinct from the first non-volatile storage medium; and after storing the corresponding data in the second non-volatile storage medium, erasing the first data from the volatile memory;

wherein:
the first data stored in the first non-volatile storage medium and the corresponding data stored in the second non-volatile storage medium are not concurrently stored; and
the volatile memory is in a same computer as the first non-volatile storage medium or the second non-volatile storage medium.

2. The method of claim 1, wherein the corresponding data includes the first data.

3. The method of claim 1, including, after reading the first data from the first non-volatile storage medium to the volatile memory, decrypting the first data, wherein the corresponding data stored in the second non-volatile storage medium includes the decrypted first data.

4. The method of claim 1, including:
after reading the first data from the first non-volatile storage medium to the volatile memory, decrypting the first data to produce a plurality of decrypted data chunks; and
for each data chunk, encrypting the respective data chunk using a respective key associated with the respective data chunk;
wherein the corresponding data stored in the second non-volatile storage medium includes the encrypted data chunks and the respective keys.

5. The method of claim 1, wherein the first data stored in the first non-volatile storage medium corresponds to a segment of a data set stored in the first non-volatile storage medium, the data set includes a plurality of segments, and the method includes repeating the method for each of the plurality of segments of the data set.

6. The method of claim 1, wherein the first non-volatile storage medium is located at a first physical medium, and the second non-volatile storage medium is located at a second physical medium distinct from the first physical medium.

7. A computer system, comprising:
one or more processors;
memory; and
one or more programs stored in the memory, the one or more programs including instructions for:
reading first data stored in a first non-volatile storage medium from the first non-volatile storage medium to volatile memory;
after reading first data from the first non-volatile storage medium to the volatile memory, erasing at least a portion of the first data from the first non-volatile storage medium;
after erasing at least a portion of the first data from the first non-volatile storage medium, storing corresponding data in a second non-volatile storage medium distinct from the first non-volatile storage physical medium; and
after storing the corresponding data in the second non-volatile storage medium, erasing the first data from the volatile memory;

wherein:
the first data stored in the first non-volatile storage medium and the corresponding data stored in the second non-volatile storage medium are not concurrently stored; and
the volatile memory is in a same computer as the first non-volatile storage medium or the second non-volatile storage medium.

8. The system of claim 7, wherein the corresponding data includes the first data.

9. The system of claim 7, including instructions for, after reading the first data from the first non-volatile storage medium to the volatile memory, decrypting the first data, wherein the corresponding data stored in the second non-volatile storage medium includes the decrypted first data.

10. The system of claim 7, including instructions for:
after reading the first data from the first non-volatile storage medium to the volatile memory, decrypting the first data to produce a plurality of decrypted data chunks; and
for each data chunk, encrypting the respective data chunk using a respective key associated with the respective data chunk;
wherein the corresponding data stored in the second non-volatile storage medium includes the encrypted data chunks and the respective keys.

11. The system of claim 7, wherein the first data stored in the first non-volatile storage medium corresponds to a segment of a data set stored in the first non-volatile storage medium, the data set includes a plurality of segments, and the system includes instructions for repeating the reading, erasing, storing, and erasing operations with respect to each of the plurality of segments of the data set.

12. The system of claim 7, wherein the first non-volatile storage medium is located at a first physical medium, and the second non-volatile storage medium is located at a second physical medium distinct from the first physical medium.

13. A non-transitory computer readable storage medium storing one or more programs configured for execution by a computer system, the one or more programs including instructions that when executed by one or more processors of the computer system cause the computer system to:
read first data stored in a first non-volatile storage medium from the first non-volatile storage medium to volatile memory;
after reading first data from the first non-volatile storage medium to the volatile memory, erase at least a portion of the first data from the first non-volatile storage medium;
after erasing at least a portion of the first data from the first non-volatile storage medium, store corresponding data in a second non-volatile storage medium distinct from the first non-volatile storage medium; and
after storing the corresponding data in the second non-volatile storage medium, erase the first data from the volatile memory;

wherein:
the first data stored in the first non-volatile storage medium and the corresponding data stored in the second non-volatile storage medium are not concurrently stored; and
the volatile memory is in a same computer as the first non-volatile storage medium or the second non-volatile storage medium.

14. The non-transitory computer readable storage medium of claim 13, wherein the corresponding data includes the first data.

15. The non-transitory computer readable storage medium of claim 13, wherein the one or more programs include instructions to, after reading the first data from the first non-volatile storage medium to the volatile memory, decrypt the first data, wherein the corresponding data stored in the second non-volatile storage medium includes the decrypted first data.

16. The non-transitory computer readable storage medium of claim 13, wherein the one or more programs include instructions to:
    after reading the first data from the first non-volatile storage medium to the volatile memory, decrypt the first data to produce a plurality of decrypted data chunks; and
    for each data chunk, encrypt the respective data chunk using a respective key associated with the respective data chunk;
    wherein the corresponding data stored in the second non-volatile storage medium includes the encrypted data chunks and the respective keys.

17. The non-transitory computer readable storage medium of claim 13, wherein the first data stored in the first non-volatile storage medium corresponds to a segment of a data set stored in the first non-volatile storage medium, the data set includes a plurality of segments, and the one or more programs include instructions to repeat the reading, erasing, storing, and erasing operations with respect to each of the plurality of segments of the data set.

18. The non-transitory computer readable storage medium of claim 13, wherein the first non-volatile storage medium is located at a first physical medium, and the second non-volatile storage medium is located at a second physical medium distinct from the first physical medium.

19. The method of claim 1, wherein
    the first non-volatile storage medium is in a first computer device and the second non-volatile storage medium is in a second computer device, distinct from the first computer device and in communication with the first computer device by a communications network, and
    the first computer device includes a first transfer status module and the second computer device includes a second transfer status module, the first transfer status module and second transfer status module for monitoring status of transferring the first data from the first non-volatile storage medium to the second non-volatile storage medium.

* * * * *